United States Patent
Johnson et al.

(10) Patent No.: US 9,089,088 B2
(45) Date of Patent: Jul. 28, 2015

(54) BAFFLE RETENTION CHANNEL FOR AN INDUCTOR BOX OF AN AGRICULTURAL IMPLEMENT

(71) Applicant: CNH America LLC, New Holland, PA (US)

(72) Inventors: Chad M. Johnson, Arlington Heights, IL (US); Michael J. Connors, Lockport, IL (US); Marvin A. Prickel, Homer Glen, IL (US)

(73) Assignee: CNH Industrial America LLC, New Holland, PA (US)

( * ) Notice: Subject to any disclaimer, the term of this patent is extended or adjusted under 35 U.S.C. 154(b) by 70 days.

(21) Appl. No.: 13/737,792

(22) Filed: Jan. 9, 2013

(65) Prior Publication Data

US 2014/0190378 A1 Jul. 10, 2014

(51) Int. Cl.
*A01C 7/08* (2006.01)

(52) U.S. Cl.
CPC ..................... *A01C 7/081* (2013.01)

(58) Field of Classification Search
CPC ............ A01C 7/00; A01C 7/04; A01C 7/042; A01C 7/08; A01C 7/081; A01C 7/082; A01C 7/084; A01C 7/085; A01C 7/10; A01C 7/102; A01C 7/123; A01C 7/125; A01C 7/16; A01C 7/206; A01C 7/20; A01C 15/04; A01C 15/06; A01C 15/08; A01C 15/10
USPC ............ 111/174, 175, 170, 200, 77; 406/184, 406/188, 190, 191, 125, 145; 221/211; 285/140.1, 210, 901; 222/563
See application file for complete search history.

(56) References Cited

U.S. PATENT DOCUMENTS

| | | | |
|---|---|---|---|
| 4,453,866 A | 6/1984 | Ryan | |
| 4,669,922 A | 6/1987 | Hooper et al. | |
| 4,758,119 A | 7/1988 | Frase et al. | |
| 4,779,765 A | 10/1988 | Neumeyer | |
| 5,133,270 A | 7/1992 | Ledermann et al. | |
| 5,939,356 A * | 8/1999 | Wellinghoff | 504/100 |
| 5,979,343 A | 11/1999 | Gregor et al. | |
| 6,148,748 A | 11/2000 | Bardi et al. | |
| 6,595,148 B2 | 7/2003 | Meyer et al. | |
| 6,688,244 B1 | 2/2004 | Meyer et al. | |
| 6,725,788 B2 * | 4/2004 | McCartney et al. | 111/175 |
| 6,776,108 B2 | 8/2004 | Crabb et al. | |
| 6,883,445 B2 | 4/2005 | Mayerle | |
| 6,928,941 B1 | 8/2005 | Sternitzke | |
| 7,025,010 B2 | 4/2006 | Martin et al. | |
| 7,213,525 B2 | 5/2007 | Meyer et al. | |
| 2010/0037807 A1 * | 2/2010 | Henning et al. | 111/84 |
| 2011/0282556 A1 * | 11/2011 | Klenz et al. | 701/50 |

FOREIGN PATENT DOCUMENTS

DE 20080018970 10/2008

* cited by examiner

*Primary Examiner* — Christopher J Novosad
(74) *Attorney, Agent, or Firm* — Rebecca L. Henkel

(57) ABSTRACT

An agricultural product distribution system is presented includes an inductor box configured to receive agricultural product and conveyed air to combine the conveyed air and the agricultural product. The conveyed air is configured to direct the agricultural product through ports to multiple distribution units. Moreover the inductor box includes a baffle retention channel configured to receive a removable baffle. Furthermore, the removable baffle includes at least one opening configured to control an amount of conveyed air directed through the ports to the multiple distribution units.

17 Claims, 5 Drawing Sheets

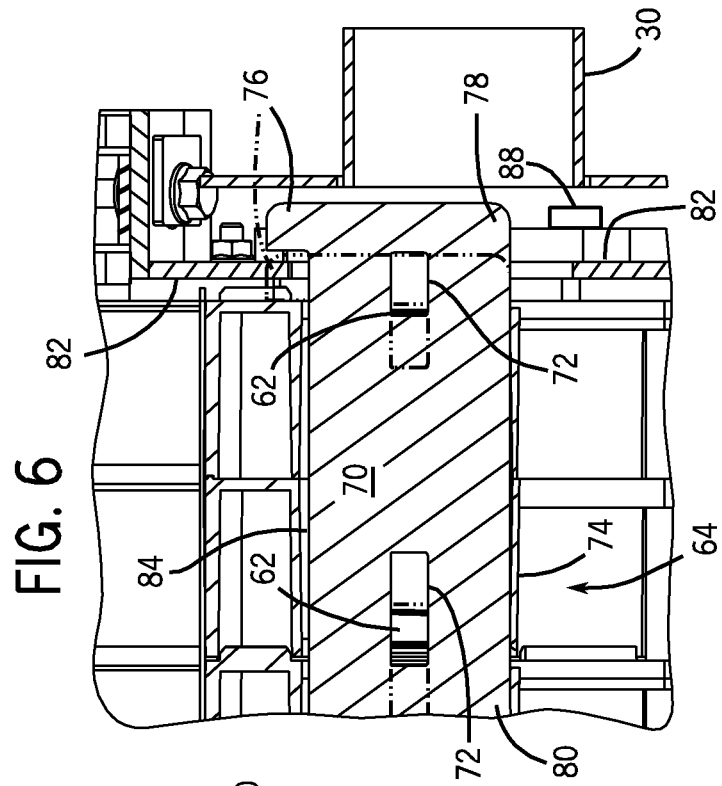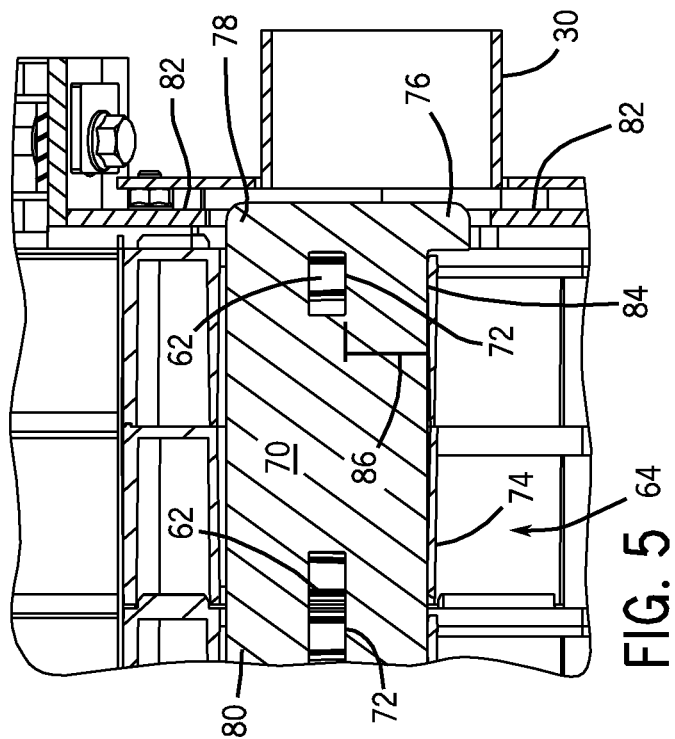

US 9,089,088 B2

BAFFLE RETENTION CHANNEL FOR AN INDUCTOR BOX OF AN AGRICULTURAL IMPLEMENT

BACKGROUND

The invention relates generally to ground working equipment, such as agricultural equipment, and more specifically, to a baffle retention channel for an inductor box of an agricultural implement.

Generally, planting implements (e.g., planters) are towed behind a tractor or other work vehicle via a mounting bracket secured to a rigid frame of the implement. These planting implements typically include multiple row units distributed across the width of the implement. Each row unit is configured to deposit agricultural product at a desired depth beneath the soil surface, thereby establishing rows of deposited product. For example, each row unit may include a ground engaging tool or opener (e.g., an opener disc) that forms a seeding path for agricultural product (e.g., seeds) deposition into the soil. In certain configurations, a gauge wheel is positioned a vertical distance above the opener to establish a desired trench depth for agricultural product deposition into the soil. As the implement travels across a field, the opener excavates a trench into the soil, and agricultural product is deposited into the trench. In certain row units, the opener is followed by a packer wheel that packs the soil on top of the deposited agricultural product.

Certain planting implements include a remote agricultural product tank, and a pneumatic distribution system configured to convey product from the tank to each row unit. For example, the pneumatic distribution system may include an inductor assembly positioned beneath the tank. The inductor assembly is configured to receive agricultural product from the tank, to fluidize the agricultural product into an air/agricultural product mixture, and to distribute the air/agricultural product mixture to the row units via a network of pneumatic hoses/conduits. Each row unit, in turn, receives the agricultural product from the pneumatic hoses/conduits, and directs the agricultural product to a metering system. The metering system is configured to provide a flow of agricultural product to a tube for deposition into the soil. By operating the metering system at a particular speed, a desired product spacing may be established as the implement traverses a field.

In certain agricultural implements, the inductor box of the agricultural implement may restrict air flow due to the size, length, and/or shape of the air conduits, the inductor box, and other portions of product distribution system. Other embodiments may include additional protrusions in the inductor box that induce the air to flow in a specific direction and/or at a specific rate. However, the inductor boxes are generally only suitable for use in one product distribution system or in one configuration of the pneumatic network.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, an agricultural product distribution system includes an inductor box configured to receive agricultural product and conveyed air to combine the conveyed air and the agricultural product. The conveyed air is configured to direct the agricultural product through ports to multiple distribution units. Moreover the inductor box includes a baffle retention channel configured to receive a removable baffle. Furthermore, the removable baffle includes at least one opening configured to control an amount of conveyed air directed through the ports to the multiple distribution units.

In another embodiment, an agricultural product distribution system includes a removable baffle selected from multiple removable baffles, wherein each removable baffle includes a plurality of openings and each removable baffle has a different baffle configuration than other removable baffles of the multiple removable baffles. The agricultural product distribution system also includes an inductor box configured to receive the agricultural product and conveyed air and to combine the conveyed air and the agricultural product. The conveyed air is configured to direct the agricultural product through a plurality of ports to multiple distribution units. Moreover, the inductor assembly includes a baffle retention channel configured to receive the removable baffle. Furthermore, at least one opening are configured to control an amount of the conveyed air directed through the plurality of ports to the multiple distribution units.

In a further embodiment, a method for conveying agricultural product through an agricultural product distribution system includes receiving a removable baffle into a baffle retention channel. Moreover, the baffle comprises at least one opening. Additionally, the method also includes receiving agricultural product and receiving conveyed air configured to direct the agricultural product through one or more ports. Furthermore, the method includes controlling airflow through the one or more ports via the at least one opening in the removable baffle.

DRAWINGS

These and other features, aspects, and advantages of the present invention will become better understood when the following detailed description is read with reference to the accompanying drawings in which like characters represent like parts throughout the drawings, wherein:

FIG. 5 is a perspective view of an embodiment of the inductor box of FIG. 4 with the baffle plate in a desired orientation; and FIG. 6 is a perspective view of an embodiment of the inductor box of FIG. 4 with the baffle plate in an undesired orientation.

DETAILED DESCRIPTION

Figure 1:
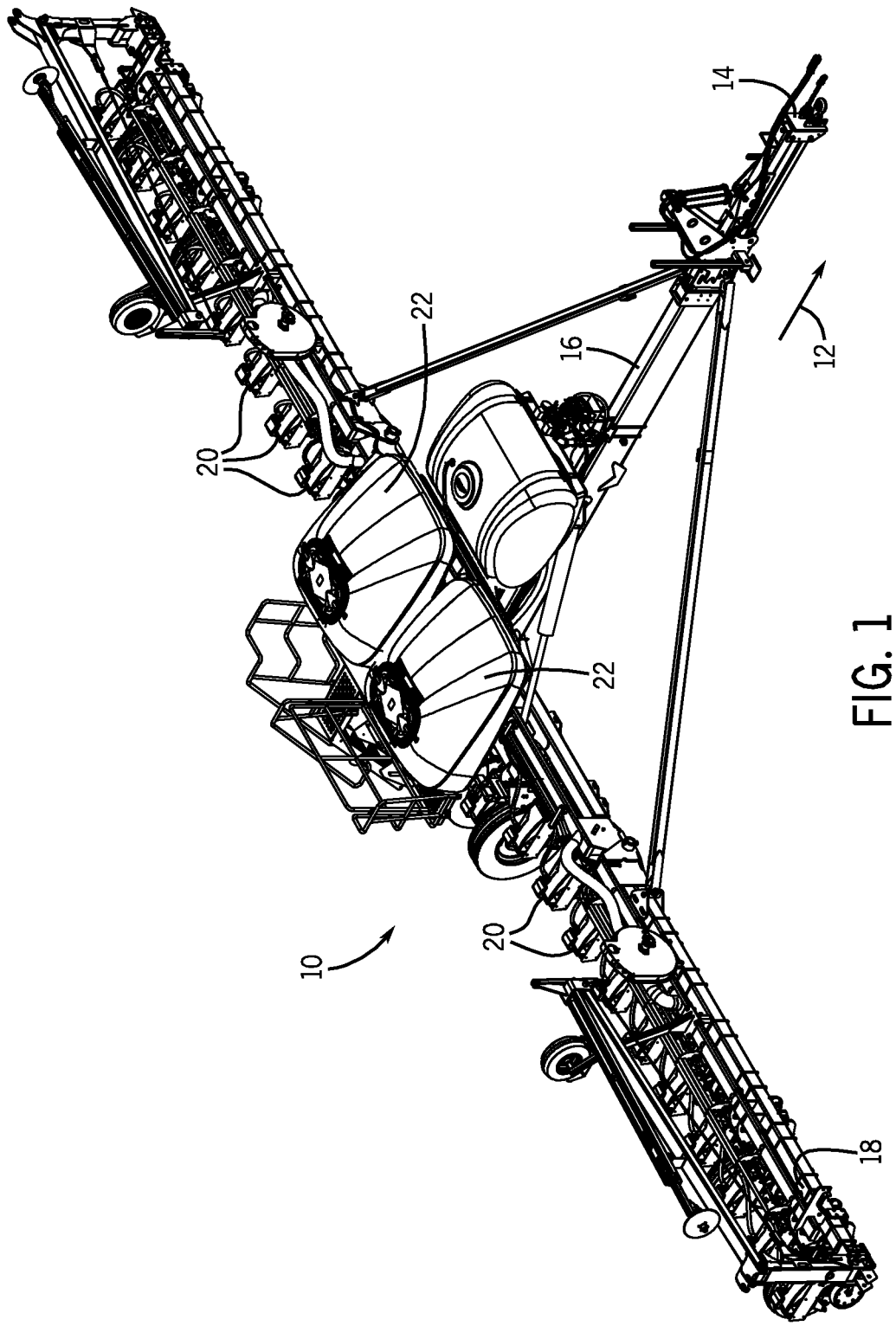
FIG. 1 is a perspective view of an embodiment of an agricultural implement having a tank and an inductor box, the agricultural implement configured to deposit agricultural product into a soil surface.

FIG. 1 is a perspective view of an embodiment of an agricultural implement 10 having a tank and an inductor box, the agricultural implement configured to deposit agricultural product (e.g., seeds and/or fertilizer) into a soil surface. For example, the agricultural implement 10 may deposit seed such as corn, grain sorghum, sweet corn, popcorn, sunflower, cotton, beans, sugar beets, peanuts, and/or other suitable seed types of various sizes and shapes. In the illustrated embodiment, the implement 10 is configured to be towed along a direction of travel 12 by a work vehicle, such as a tractor or other prime mover. The work vehicle may be coupled to the implement 10 by a hitch assembly 14. As illustrated, the hitch assembly 14 is coupled to a main frame assembly 16 of the implement 10 to facilitate towing of the implement 10 in the direction of travel 12. In the illustrated embodiment, the frame assembly 16 is coupled to a tool bar 18 that supports multiple row units 20. Each row unit 20 is configured to deposit agricultural product at a desired depth beneath the soil surface, thereby establishing rows of planted agricultural product. The implement 10 also includes agricultural product tanks 22, and a pneumatic distribution system configured to convey agricultural product from the tanks to the row units 20. In certain embodiments, the pneumatic distribution system includes an inductor box positioned beneath each agricultural product tank 22. Each inductor box is configured to receive agricultural product from a respective tank, to fluidize the agricultural product into an air/agricultural product mixture, and to distribute the air/agricultural product mixture to the row units 20 via a network of pneumatic hoses/conduits.

In certain embodiments, each row unit 20 includes a residue manager, an opening assembly, a tube, closing discs, and a press wheel. The residue manager includes a rotating wheel having multiple tillage points or fingers that break up crop residue, thereby preparing the soil for agricultural product deposition. The opening assembly includes a gauge wheel and an opener disc. The gauge wheel may be positioned a vertical distance above the opener disc to establish a desired trench depth for agricultural product deposition into the soil. As the row unit travels across a field, the opener disc excavates a trench into the soil for agricultural product deposition. The tube, which may be positioned behind the opening assembly, directs agricultural product from a distribution unit (e.g., metering system and/or hopper) into the excavated trench. The closing discs then direct the excavated soil into the trench to cover the deposited agricultural product. Finally, the press wheel packs the soil on top of the agricultural product with a desired pressure.

While the illustrated implement 10 includes 24 row units 20, it should be appreciated that alternative implements may include more or fewer row units 20. For example, certain implements 10 may include 6, 8, 12, 16, 24, 32, or 36 row units, or more. In addition, the spacing between row units may be particularly selected based on the type of crop being planting. For example, the row units may be spaced 30 inches from one another for planting corn, and 15 inches from one another for planting soy beans.

As discussed in detail below, the inductor box may receive removable baffle plates that are inter-changeable according to the type of seed to be planted and/or the configuration/number of row units 20 included in the agricultural implement 10. For example, in some embodiments, a baffle plate may include smaller openings and/or less openings to restrict airflow through a bypass channel. By restricting the airflow through the bypass channel, an increased proportion on air flows directly through the seed, which promotes the delivery of larger seeds. Additionally, in some embodiments, the number and/or position of openings in the baffle plate may vary according to the number of row units included in the implement 10 and/or the distance between each row unit 20 and the inductor box. For example, in some embodiments, a baffle plate may include a smaller number of openings or smaller openings to encourage a higher seed to air ratio to be delivered on a longer conduit run than on a short conduit run. In openings adjacent to short conduits, a larger opening size/number of openings reduces the number of seeds delivered through the short conduit. However, if the number of row units 20 is less than the number of outlet ports in the inductor box, the baffle plate may omit openings at locations opposite the unused ports. In some embodiments, the interchangeable baffle plates are removable and may be inserted in a desired orientation within the inductor box using a baffle plate retention channel of the inductor box. In some embodiments, the baffle plate may be disposed against openings in the inductor box when fully inserted. Additionally, in some embodiments, the baffle plate retention channel may include one or more openings that enable debris to evacuate the channel during operation of the inductor box, during movement of the baffle plate, and/or during other suitable periods.

Furthermore, certain embodiments of the agricultural implement 10 having a removable baffle plate include a component that correctly aligns the baffle plate with the baffle plate retention channel prior to operation of the agricultural implement 10. For example, in some embodiments, the baffle plate may include a tang that blocks insertion of the baffle plate into the baffle plate retention channel if the baffle plate is misaligned. In some embodiments, the baffle plate may be positioned within the baffle plate retention channel in an improper orientation, but the tang may block full insertion of the baffle plate in an undesired orientation and/or block operation of the agricultural implement until the baffle plate is oriented correctly. For example, in some embodiments, an air inlet may be removed from the inductor box prior to installation of the baffle plate. The tang blocks proper reinsertion of the air inlet if the baffle plate is inserted incorrectly, thus at least partially blocking operation of the agricultural implement 10 when the baffle plate is inserted in an undesired orientation.

Figure 2:
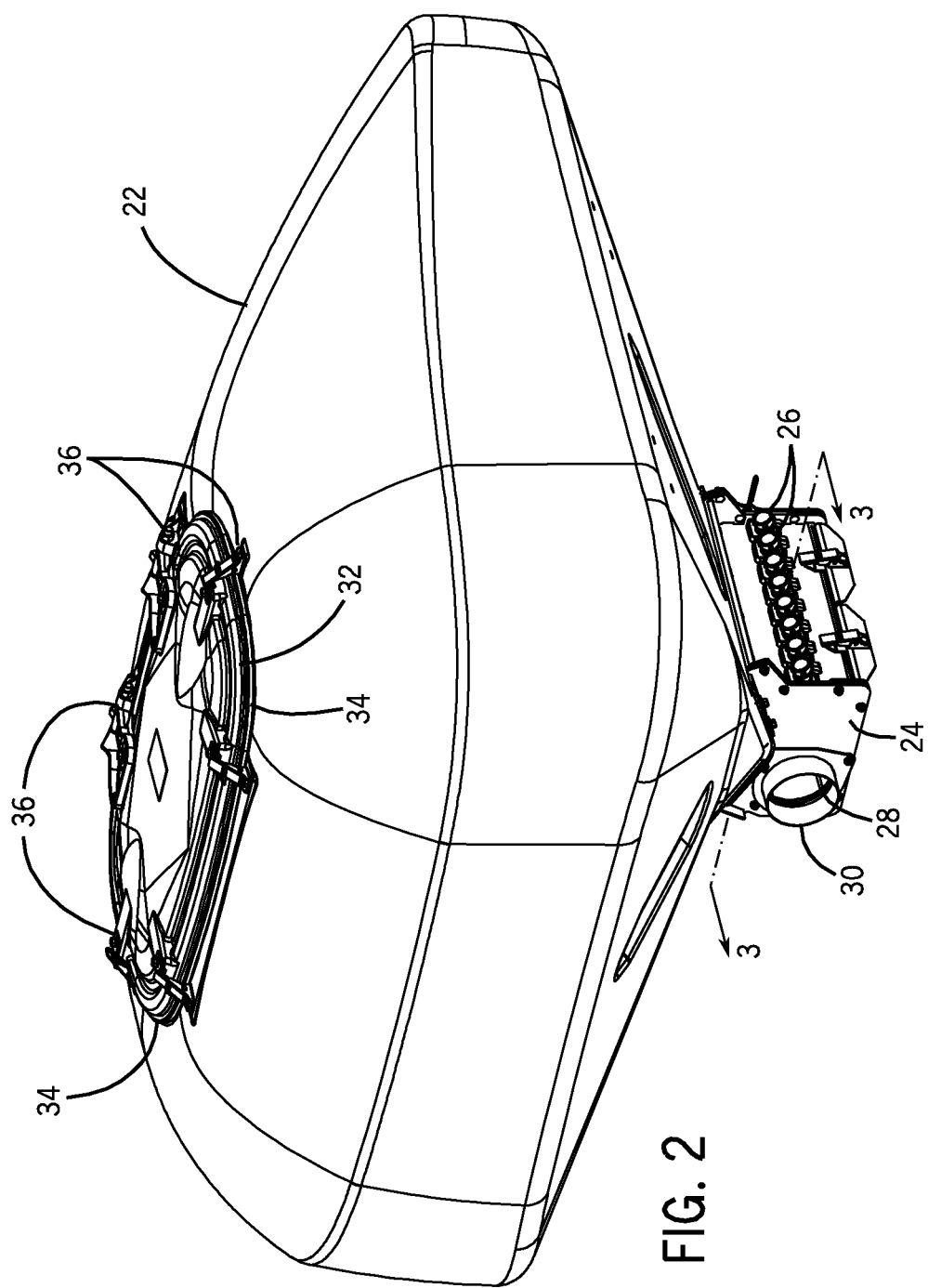
FIG. 2 is a perspective view of an embodiment of the tank and the inductor box of FIG. 1.

FIG. 2 is a perspective view of an embodiment of the tank 22 and the inductor box 24. As illustrated, the inductor box 24 includes multiple outlet ports 26 that may be coupled to respective air conduits that couple the row units 20 to the inductor box 24. Additionally, the inductor box 24 includes an air supply chamber 28 through which the inductor box 24 receives conveyed air. In some embodiments, the agricultural implement 10 includes an air supply (e.g., a fan or a blower) that directs air through the air supply chamber 28 to the inductor box 24. In certain embodiments, the air supply chamber 28 may receive air from any suitable air conveying device. Additionally, some embodiments of the agricultural implement 10 include an air inlet 30 that may sealingly couple an air conduit to the inductor box 24 for air to be conveyed into the inductor box 24 from an air conveying device. In some embodiments, the air inlet 30 may be coupled to the inductor box 24 using brackets, screws, bolts, braces, or other suitable coupling methods that enable a sealed connection between the inductor box 24 and the air conduit. Furthermore, in certain embodiments, the air inlet 30 may be coupled to the air conduit using brackets, braces, gaskets, or other suitable methods for coupling a conduit to the air inlet 30. Moreover, in some embodiments, the air inlet 30 may be formed as part of the air conduit rather than distinct from the air conduit.

The agricultural product tank 22 includes a lid 32. In some embodiments, the lid 32 may at least partially seal the agricultural product tank 22 to enable pressurization of the tank 22 using the air conveyed through the air supply chamber 28. Additionally, in some embodiments, the agricultural product tank 22 may expand when the air received through the air supply chamber 28 pressurizes the agricultural product tank 22. In embodiments having an expandable agricultural product tank 22, the lid 32 may include a sealing gasket 34 that maintains a sealed connection between the lid 32 and the agricultural product tank 22. In some embodiments, the sealing gasket 34 may include a resilient material such as rubber, silicone, and/or other materials suitable for sealing and/or maintaining a seal between the agricultural product tank 22 and the lid 32. Furthermore, the agricultural product tank 22 may include one or more hinges 34 that pivotably couple the lid 32 to the agricultural product tank 22. Additionally, the agricultural product tank 22 includes one or more closing brackets 36. In some embodiments, the one or more closing brackets 36 may be positioned around the perimeter of the lid 32. In embodiments having one or more hinges 34, the closing brackets 36 may be omitted from at least one side of the lid 32 having a hinge 34. In certain embodiments, one or more closing brackets 36 may be positioned at a location opposite from the hinges 36.

Figure 3:
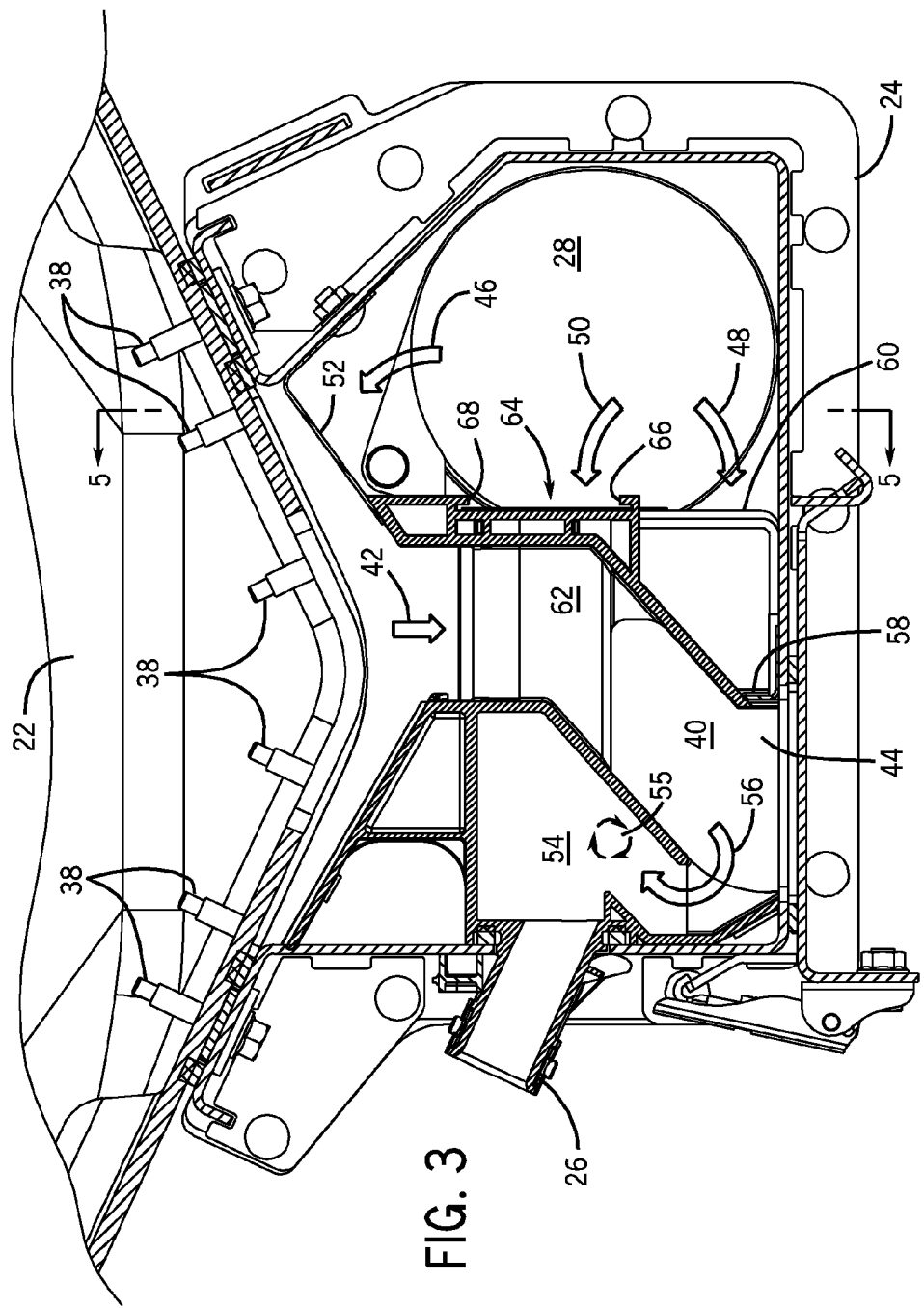
FIG. 3 is a cross-sectional view of an embodiment of the inductor box of FIG. 1.

FIG. 3 is a cross-sectional view of an embodiment of the inductor box 24. As illustrated, the inductor box 24 is coupled to the agricultural product tank 22 using one or more bolts 38. In certain embodiments, the agricultural product tank 22 may be coupled to the inductor box 24 using bolts, brackets, screws, material bonding, and/or other suitable methods for coupling the agricultural product tank 22 to the inductor box 24. As illustrated, the inductor box 24 includes a seed cavity 40 through which seeds and/or agricultural product enters the inductor box 24 from the agricultural product tank 22. As illustrated, the seed and/or agricultural product flows along a seed flow path 42 and is deposited into the seed bed 44. The inductor box 24 also receives air from the air supply chamber 28 and directs portions of the received air into an upper air flow path 46, a seed bed path 48, and an air bypass path 50. The portion of air flowing through the upper air flow path 46 passes through a seed screen 52 that blocks seeds and/or agricultural product from entering the air supply chamber 28 from the seed cavity 40. As air flows through the upper air flow path 46, a portion of the conveyed air flows through the seed cavity 40 toward the seed bed 44, thereby urging the seeds toward the seed bed 44 and toward a delivery chamber 54. As the agricultural product enters the fluidization chamber 54, the agricultural product enters the fluidization chamber 55. When the airflow through the fluidization chamber 55 and the delivery chamber 54 is sufficient, agricultural product will fluidize and a vortex flow is created in the fluidization chamber 55. The vortex separates and mixes the agricultural product with the airflow before the particulate material flows to the delivery chamber 54. If the air flow through the fluidization chamber 55 is sufficient, the agricultural product is conveyed out of the fluidization chamber 55 and into the delivery chamber 54. At the seed bed 44, the portion of air flowing from the upper air flow path 46 and the portion of air flowing through the seed bed path 48 join to urge seeds and/or agricultural product from the seed bed 44 up through the fluidization chamber 55 via a seed lift path 56. As illustrated, the inductor box 24 includes a seed bed screen 58 that blocks seeds and/or agricultural product from entering the air supply chamber 28 from the seed bed 44. In some embodiments, the inductor box 24 may include an air supply chamber screen 60 in addition to, or in place of, the seed bed screen 58.

Certain embodiments of the inductor box 24 also include an air bypass channel 62 that enables a portion of the conveyed air to flow from the air supply chamber 28 to the delivery chamber 54 via the air bypass path 50. In some embodiments, 50 percent of the air received by the air supply chamber 28 may be directed into the of air bypass paths 50. In other embodiments, 40 percent, 30 percent, 20 percent, or less of the air may be directed into the air bypass paths 50. The air flowing through the air bypass path 50 urges seeds from the delivery chamber 54 through the outlet port 26 and into an air conduit leading to a distribution unit 24 to row unit 20 while indirectly decreasing the amount of airflow through the seedbed, thus reducing particulate density of the agricultural product/air mixture. As may be appreciated, a size of an air flow path between the air supply chamber 28 and the air bypass channel 62 controls the amount of air passed through the air bypass path 50. In other words, a large opening in the air flow path may decrease the density of seeds/agricultural product entrained within the airstream Furthermore, as may be appreciated, a small bypass opening may provide more force through the seedbed 44 to urge the seeds and/or agricultural product to the row units 20 relative to a large opening. Accordingly, a small opening may be more suitable for conveying agricultural product with a large size (e.g., large seed and/or seeds coated with fertilizer, herbicide, and/or insecticide) and/or product of a particular type (e.g., corn kernels). In the illustrated embodiment, the amount of air passing through the air bypass path 50 is controlled by a baffle plate inserted into a baffle plate retention channel 64. The baffle plate retention channel 64 includes a lower channel 66 and an upper channel 68 that receive a lower end of the baffle plate and an upper end of the baffle plate, respectively. In some embodiments, the baffle plate may be slidingly inserted into the baffle plate retention channel 64 through the air supply chamber 28. Because the agricultural product and/or the row unit configuration may vary, a desired baffle plate may be selected according to the configuration of the row units 20 and/or the selected agricultural product.

Figure 4:
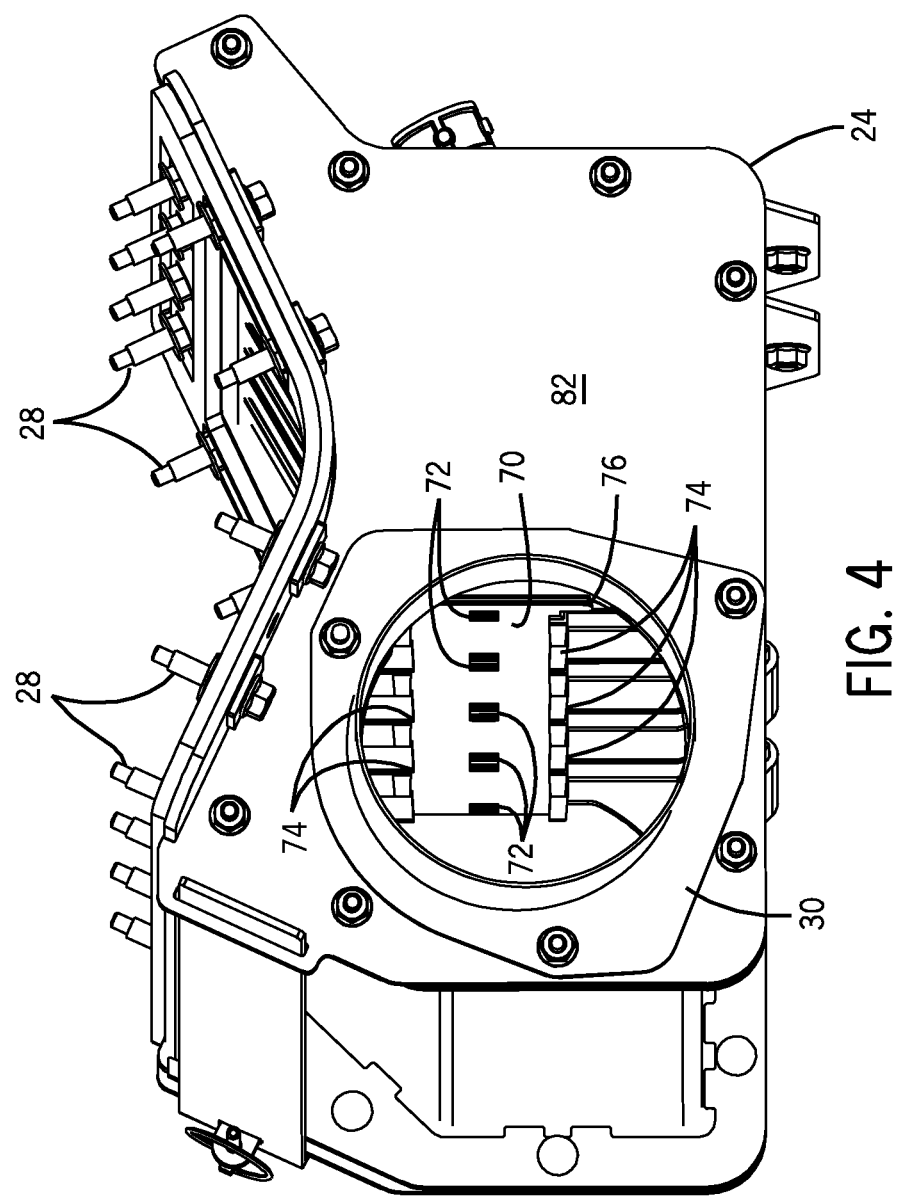
FIG. 4 is a perspective view of an embodiment of the inductor box of FIG. 1 having a baffle plate.

FIG. 4 is a perspective view of an embodiment of the inductor box 24 of FIG. 1 having a baffle plate 70 inserted into the baffle retention channel 64. In some embodiments, the baffle plate may be formed from plastic, metal (e.g., steel), or other resilient materials suitable for controlling air flow through the inductor box 24. FIG. 4 illustrates the inductor box 24 from a side opposite the side shown in FIG. 3. As illustrated, the baffle plate 70 includes one or more openings 72. In some embodiments, each opening may correspond to a respective air bypass channel 62 and outlet port 26. However, in some embodiments, each air bypass channel 62 may correspond to multiple openings in the baffle plate 70. In other words, more than one opening 72 may be aligned with each air bypass channel 62. For example, in some embodiments, an air bypass channel 62 may receive conveyed air from 1, 2, 3, 4, 5, or more openings 72. In certain embodiments, the baffle plate 70 may have a single opening having either a fixed width along the length of the baffle plate 70 or a variable width opening that varies the width between some of the openings 72. For example, in some embodiments, a single opening may extend from a first end of the baffle plate to a second end with a narrow opening at the first end that progressively widens as the opening approaches the second end.

Additionally, the number and/or the size of the openings 72 may vary according to a size of the agricultural product to be deposited into soil by the agricultural implement 10 and/or the configuration of the agricultural implement 10. For example, if large seeds or flow challenged seeds such as coated seeds are to be deposited into soil by the agricultural implement 10, a corresponding baffle plate 70 having smaller openings 72 may be used (e.g., smaller openings than a baffle plate 70 that is designed to be used with small seeds/fertilizer). Additionally, a baffle plate 70 used to distribute large agricultural product may have less openings per air bypass channel 62 than a baffle plate 70 used to distribute small agricultural product. As may be appreciated, less air may flow through a baffle plate 70 that is configured to distribute large seeds, thereby reducing the airflow through the air bypass channel 62, which in turn increases the amount of air flowing through the seedbed 44 to urge the agricultural product through the outlet port 26 toward a respective row unit 20.

In some embodiments, the number and/or the size of the openings 72 may be selected according to the length of each air conduit extending between a respective row unit 20 and the inductor box 24. For example, a greater air flow may be provided to convey product through a long air conduit than a shorter conduit (e.g., an air flow sufficient to urge the agricultural product to the row unit). For example, a longer conduit will tend to convey less airflow than a short conduit due to the larger air restriction. Therefore, in order to provide a desired seed delivery rate (e.g., seeds/sec), the density of seed within the airflow may be increased in a longer conduit to achieve the desired delivery rate. Accordingly, in some embodiments, a region of the baffle plate 70 corresponding to an air bypass channel 62 leading to a short air conduit may have more and/or larger openings 72 than a region of the baffle plate 70 corresponding to an air bypass channel 62 leading to a long air conduit. In other words, as the length of an air conduit increases, the size and/or number of openings 72 in a corresponding region of the baffle plate 70 decreases. Because not all air conduits coupled to the inductor box 24 have the same length, the number and/or size of the openings 72 in the baffle plate 70 may vary. For example, in some embodiments, a first region corresponding to one air bypass channel 62 may have five openings 72 in the baffle plate 70, while a second region corresponding to a second air bypass channel 62 may have eight openings 72. Additionally, in some embodiments, a first region corresponding to a first air bypass channel 62 may have large openings 72, while a second region corresponding to a second air bypass channel 62 may have small openings 72. In such embodiments, the first air bypass channel 62 may correspond to a shorter air conduit than an air conduit of the second air bypass channel 62.

Debris (e.g., seeds, dirt, dust, etc.) may become lodged in the lower channel 66 and/or the upper channel 68 during operation of the inductor box 24. Accordingly, the lower channel 66 includes multiple breaches 74 that enable debris to evacuate the lower channel 66. Additionally, the inductor box 24 includes multiple breaches in the upper channel 68. By locating the breaches 74 within each channel 66 and 68, debris may evacuate the lower channel 66 and/or the upper channel 68 during operation of the inductor box 24, during the insertion of the baffle plate 70, and/or during the removal of the baffle plate 70.

The baffle plate 70 is removable and designed to be disposed within the baffle plate retention channel 64 in a specific orientation. Accordingly, the baffle plate 70 includes a tang 76 that facilitates insertion of the baffle plate 70 within the baffle plate retention channel 64 in a desired orientation (e.g., blocks insertion in an undesired orientation). Moreover, the tang 76 may block the removal of the baffle plate 70 from the baffle plate retention channel 64 when the baffle plate 70 is fully inserted into the baffle plate retention channel 64. In other embodiments, the baffle plate 70 may include a recess, a protrusion, or other physical features that block insertion of the baffle plate 70 in an undesired orientation.

FIG. 5 is a perspective view of an embodiment of the inductor box 24 of FIG. 4 with the baffle plate 70 disposed within the baffle plate retention channel 64 in a desired orientation that facilitates alignment of the openings 72 with respective air bypass channels 62. In some embodiments, if a user inserts the baffle plate 70 in an undesired orientation, the openings 72 may be misaligned with each respective air bypass channel 62 (e.g., either vertically or horizontally), thereby resulting in the agricultural implement functioning ineffectively. For example, if the baffle plate is inserted in an undesired orientation, the air flow through the air bypass channels may be insufficient to direct agricultural product 10 to the row units 20. Additionally, if the baffle plate 70 is inserted in an undesired orientation, an opening 72 with larger/more apertures may be undesirably aligned with an air bypass channel 62 that corresponds to a longer air conduit, rather than the intended air bypass channel 62. Accordingly, to facilitate proper orientation of the baffle plate 70, the baffle plate 70 includes a tang 76 formed on at least one end of the baffle plate 70. As may be appreciated, by positioning the tang 76 on a first end 78 of the baffle plate 70, the tang 76 enables the baffle plate 70 to be inserted into the baffle plate retention channel 64 such that a second end 80 extends toward an interior of the air supply chamber 28, and the first end 78 remains adjacent to the air inlet 30 and/or an end plate 82 of the inductor box 24. Accordingly, when the baffle plate 70 is inserted fully (e.g., completely) into the baffle plate retention channel 64, each opening 72 is aligned with to the corresponding air bypass channel 62.

In some embodiments, the baffle plate 70 may include openings that are closer to a lateral edge 84 of the baffle plate 70. In such embodiments, the vertical position of the openings may vary with the orientation of the baffle plate 70. Accordingly, with the baffle plate 70 in the desired orientation, a vertical height 86 of the openings 72 substantially corresponds to a vertical height of the air bypass channels 62. To establish a desired vertical height 86 of the openings 72, the baffle plate 70 includes the tang 76 formed on the first end 78 of the baffle plate 70. In some embodiments, the tang 76 is a protrusion extending from a lateral edge 84 of the first end 78 of the baffle plate 70. When the baffle plate 70 is inserted with the tang 76 in a proper orientation, as illustrated, the baffle plate retention channel 64 fully receives the baffle plate 70 within the inductor box 24 such that the baffle plate 70 does not extend laterally beyond the end plate 82. After the baffle plate 70 is fully inserted into the inductor box 24, the air inlet 30 and/or the respective air conduit may be coupled to the inductor box 24, thereby enabling air to flow through the air supply chamber 28. Thus, when the tang 76 is in the proper orientation, the agricultural implement 10 may efficiently perform the conveyance functions previously described.

FIG. 6 is a perspective view of an embodiment of the inductor box 24 of FIG. 4 with the baffle plate 70 inserted into the baffle plate retention channel 64 in an undesirable orientation. As discussed below, in certain embodiments, if the baffle plate 70 is inserted in an undesirable orientation (e.g., the tang 76 extends vertically above the baffle plate 70), at least some functions of the agricultural implement 10 may be blocked or inhibited (e.g., partially blocked). For example, in some embodiments, if the baffle plate 70 is inserted in an undesirable orientation, the air inlet 30, an air conduit, and/or other components of the agricultural implement 10 may be blocked from correctly coupling to the inductor box 24. As illustrated, the tang 76 blocks the baffle plate 70 from being fully inserted into the baffle plate retention channel 64 because the tang 76 contacts the end plate 82. In other words, the end plate 82 blocks the baffle plate 70 from being fully inserted into the baffle plate retention channel 64, thereby causing the baffle plate 70 to extend laterally beyond the end plate 82. As may be appreciated, contact between the end plate 82 and the baffle plate 70 may alert a user that the baffle plate 70 is undesirably oriented within the baffle plate retention channel 64. In addition, at least some function of the agricultural implement 10 may be blocked due to the undesirable orientation of the baffle plate 70. For example, in some embodiments, when the baffle plate 70 extends beyond the end plate 82, the baffle plate 70 may block a sealing connection from being formed between the air inlet 30 and the end plate 82. As a result, air pressure may be lost via the connection between the air conduit and the inductor box 24, which may interfere with the agricultural product flowing function.

Additionally, in some embodiments, a sensor 88 may be included to measure whether the air inlet 30 is effectively coupled to the end plate 82 and/or whether the air pressure/flow within the air supply chamber 28 corresponds to an expected value. For example, the sensor 88 may detect whether the air conduit and/or the air inlet 30 contacts the inductor box 24 using a contact sensor (e.g., electrical contact points). Furthermore, in some embodiments, the sensor 88 may measure whether the air flow/pressure within the inductor box 24, the air inlet 30, and/or the air conduit is below an expected value in relation to a volume of conveyed air. Upon detection that the air inlet 30 is not effectively coupled to the inductor box 24 and/or the air pressure/flow is below an expected value, at least some functions of the agricultural implement 10 may be blocked. For example, in some embodiments, the fan conveying air to the inductor box 24 may be disabled until the sensed coupling issue is addressed (e.g., the baffle plate 70 is properly oriented within the baffle plate retention channel 62 and the air inlet is effectively coupled to the inductor box 24).

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A agricultural product distribution system comprising:
an inductor box configured to receive agricultural product and conveyed air and to combine the conveyed air and the agricultural product, wherein the conveyed air is configured to direct the agricultural product through ports to a plurality of distribution units, the inductor box comprises a baffle retention channel that receives a removable baffle, and the removable baffle comprises at least one opening configured to control an amount of the conveyed air directed through the ports to the plurality of distribution units.

2. The agricultural product distribution system of claim 1, comprising a tank configured to provide the agricultural product to the inductor box.

3. The agricultural product distribution system of claim 1, comprising an air supply configured to supply the conveyed air to the inductor box.

4. The agricultural product distribution system of claim 1, wherein each distribution unit of the plurality of distribution units comprises an agricultural product hopper, a metering device, or some combination thereof.

5. The agricultural product distribution system of claim 1, wherein the agricultural product comprises coated seeds.

6. The agricultural product distribution system of claim 1, wherein the baffle retention channel comprises breaches to enable debris to evacuate the baffle retention channel.

7. The agricultural product distribution system of claim 1, wherein the agricultural product comprises corn, soybeans, grain sorghum, sweet corn, popcorn, sunflower, cotton, edible beans, sugar beets, or peanuts.

8. The agricultural product distribution system of claim 1, wherein the agricultural product comprises fertilizer, herbicide, or insecticide.

9. The agricultural product distribution system of claim 1, comprising the removable baffle configured to be inserted into the baffle retention channel.

10. The agricultural product distribution system of claim 1, wherein a number of the at least one opening, a size of the at least one opening, or some combination thereof, is selected based at least in part on a type of the agricultural product, a size of the agricultural product, or some combination thereof.

11. An agricultural product distribution system comprising:
a removable baffle selected from a plurality of removable baffles, wherein each removable baffle of the plurality of removable baffles comprises at least one opening and each removable baffle of the plurality of removable baffles has a different baffle configuration than other removable baffles of the plurality of removable baffles; and
an inductor box configured to receive agricultural product and conveyed air and to combine the conveyed air and the agricultural product, wherein the conveyed air is configured to direct the agricultural product through a plurality of ports to a plurality of distribution units, the inductor box comprises a baffle retention channel configured to receive the removable baffle, and the at least one opening is configured to control an amount of conveyed air directed through the plurality of ports to the plurality of distribution units.

12. The agricultural product distribution system of claim 11, wherein the at least one opening is arranged in the baffle configuration based at least in part according to a distance between the plurality of distribution units and the inductor box.

13. The agricultural product distribution system of claim 11, wherein an opening size of the at least one opening is selected based at least in part on a size of the agricultural product.

14. The agricultural product distribution system of claim 11, wherein an number of openings of the at least one opening is selected based at least in part on a size of the agricultural product.

15. The agricultural product distribution system of claim 11, wherein an aperture size of the at least one opening is at least partially based on a length of an air conduit coupled to the plurality of ports.

16. The agricultural product distribution system of claim 11, the baffle retention channel comprises:
an upper channel that is configured to receive an upper edge of the removable baffle; and
a lower channel that is configured to receive a lower edge of the removable baffle.

17. The agricultural product distribution system of claim 11, wherein the removable baffle comprises a plate having the at least one opening.

* * * * *